United States Patent [19]

Maciulaitis

[11] 4,304,392
[45] Dec. 8, 1981

[54] SEALING MEANS
[75] Inventor: Vytautas K. Maciulaitis, Chicago, Ill.
[73] Assignee: Crane Co., New York, N.Y.
[21] Appl. No.: 242,773
[22] Filed: Mar. 11, 1981

Related U.S. Application Data

[63] Continuation-in-part of Ser. No. 129,150, Mar. 10, 1980, abandoned, which is a continuation-in-part of Ser. No. 894,780, Apr. 10, 1978, abandoned.

[51] Int. Cl.³ ............................................. F16K 1/228
[52] U.S. Cl. .................................... 251/173; 251/174; 251/306
[58] Field of Search ............... 251/173, 174, 304, 305, 251/306, 315

[56] References Cited

U.S. PATENT DOCUMENTS

| | | | |
|---|---|---|---|
| 3,578,288 | 5/1971 | Rishoud | 251/306 |
| 3,584,833 | 6/1971 | Grenier | 251/315 |
| 3,591,133 | 7/1971 | Miles | 251/306 |
| 3,771,763 | 11/1973 | Myers | 251/306 |
| 3,801,066 | 4/1974 | Miles et al. | 251/306 |
| 4,005,848 | 2/1975 | Eggleston | 251/173 |
| 4,113,231 | 9/1978 | Halpine | 251/174 |

Primary Examiner—H. Jay Spiegel
Attorney, Agent, or Firm—George S. Schwind; Charles N. J. Ruggiero

[57] ABSTRACT

A bi-directional valve sealing means for location in a chamber formed by diverging juxtaposed surfaces on the valve body and the retaining means removably affixed to the valve body. The sealing means extends into the passage through the valve body for rotation about a point in the chamber, the sealing means becoming wedged into fluid-tight contact with the valve closure means when the valve closure means is rotated to block the flow of fluid through the valve passage.

5 Claims, 7 Drawing Figures

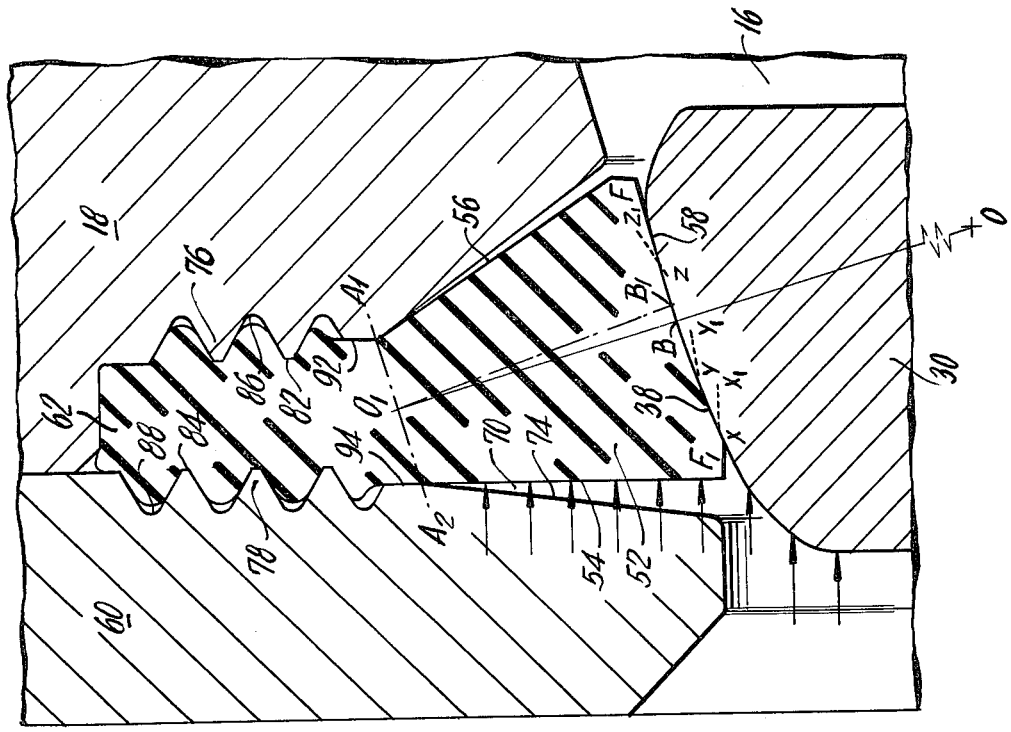
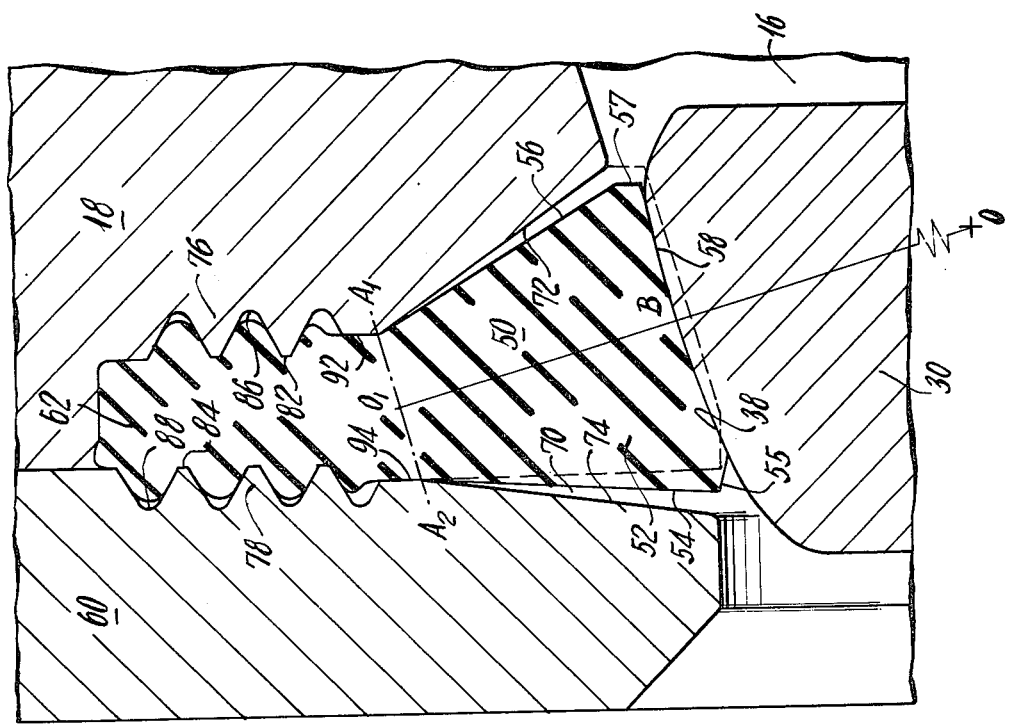

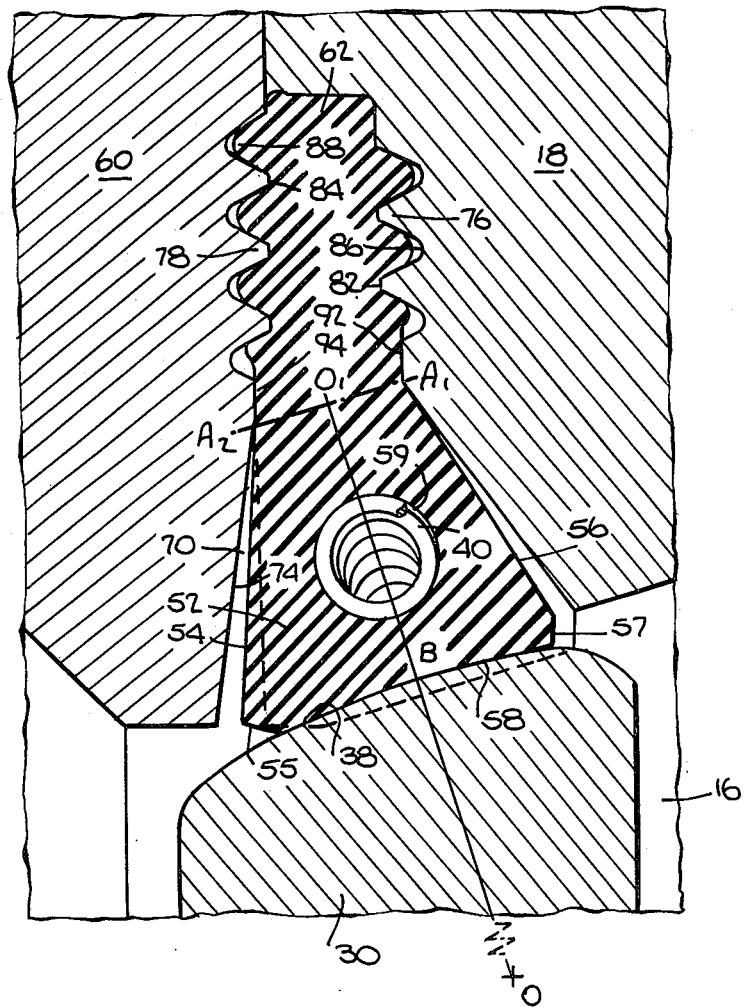

SEALING MEANS

RELATED APPLICATION

This case is a continuation-in-part of U.S. Application Ser. No. 129,150, filed Mar. 10, 1980, now abandoned, which is a continuation-in-part of Ser. No. 894,780, filed Apr. 10, 1978, now abandoned.

BACKGROUND AND SUMMARY OF THE INVENTION

This invention relates to a bi-directional seal means having application in valves, particularly in butterfly valves. Butterfly valves have several advantages over other type valves in the regulation of fluid flow including low cost of manufacture, quickness of opening and minimal restriction to fluid flow when fully open. However, these valves generally have been limited to low pressure applications because of the inability to seal tightly at high pressures. In some prior art valves, the seals are located in grooves in the valve body and often these seals become dislodged when the valve is open permitting fluid to flow around the seal and dislodge it. In still others, high pressure fluid may leak through the valve by flowing between the valve body and seal. In many prior art valves contact between the disc and valve must be made so tight to prevent leakage that opening the valve, particularly large diameter valves, requires a large torque. Moreover, many prior art valve are not truly bi-directional, in that, they do not exhibit uniform performance characteristics to fluid flow in both directions. In addition, the seals in many commercially available valves comprise a plurality of complex parts, thereby increasing the cost to manufacture, the likelihood of manufacturing defects and the possibility of misalignment during assembly.

It is an object of the present invention to provide an improved bi-directional valve seal assembly which will not leak under high pressure and which is operable with a relatively low torque.

It is a further object to provide a reliable, relatively inexpensive valve seal assembly.

BRIEF DESCRIPTION OF THE DRAWINGS

FIG. 4 is an enlargement of the seal assembly of FIGS. 1 and 2 showing the seat ring preloaded but not pressurized by fluid flow. The solid lines indicate the position and shape of the seat ring after being contacted by the valve disc, while the broken lines indicate the position of the seat ring when the disc is open permitting fluid flow through the conduit.

FIG. 5 is an enlargement of FIGS. 1 and 2 showing the seat ring preloaded and pressurized by upstream fluid pressure.

FIG. 7 is a preferred embodiment of the seat ring of FIG. 4 showing the seat ring preloaded but not pressurized by fluid flow.

DESCRIPTION OF THE PREFERRED EMBODIMENT

Figure 1:
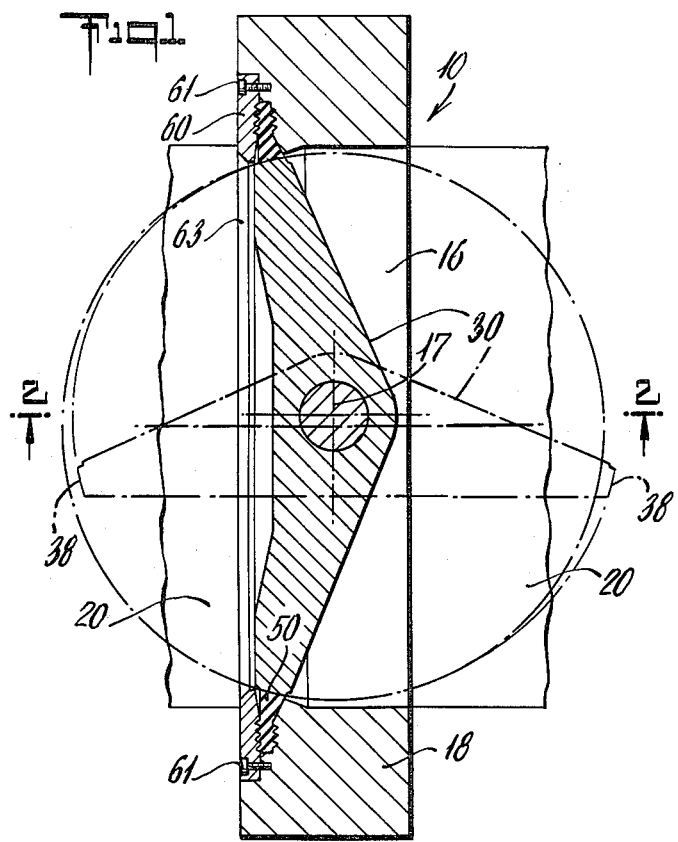
FIG. 1 is a plan view, in section, of a butterfly valve utilizing the seal assembly of this invention with the valve disc shown in solid lines in the closed position, and in broken lines in the open position.
Figure 2:
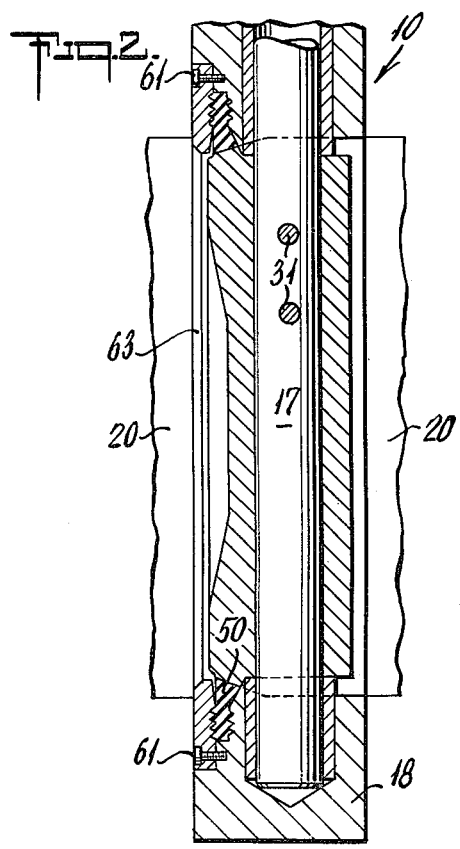
FIG. 2 is an elevational view, in section, along line 2—2 of FIG. 1 with the valve disc shown in the closed position.

Referring to the drawings, and more particularly to the embodiment of FIGS. 1 and 2, a valve, generally represented as 10, having a central passage 16 in valve body 18 is shown located in conduit 20. A valve closure means, such as rotatable disc 30 having curvilinear peripheral land 38 is shown in solid lines in the closed position and in broken lines in the open position. Disc 30 is pivoted by stem 17, which is affixed to the disc by fasteners 31, and to which is attached a handle (not shown). Seal means, such as seat ring 50, is disposed in valve body 18 and a retaining means, such as retaining ring 60, having opening 63 therethrough concentric with central passage 16, is removably connected to valve body 18 by fasteners 61. In this embodiment, the axis of rotation of disc 30 does not coincide with a centerline through seat ring 50, thereby resulting in eccentric movement of the disc relative to the seat ring. This eccentricity causes faster break-away between the disc and seat ring than would result if the disc and seat ring centerlines coincided. However, the subject invention may be practiced with coincidence of the disc axis of rotation and the seat ring centerline.

Figure 3:
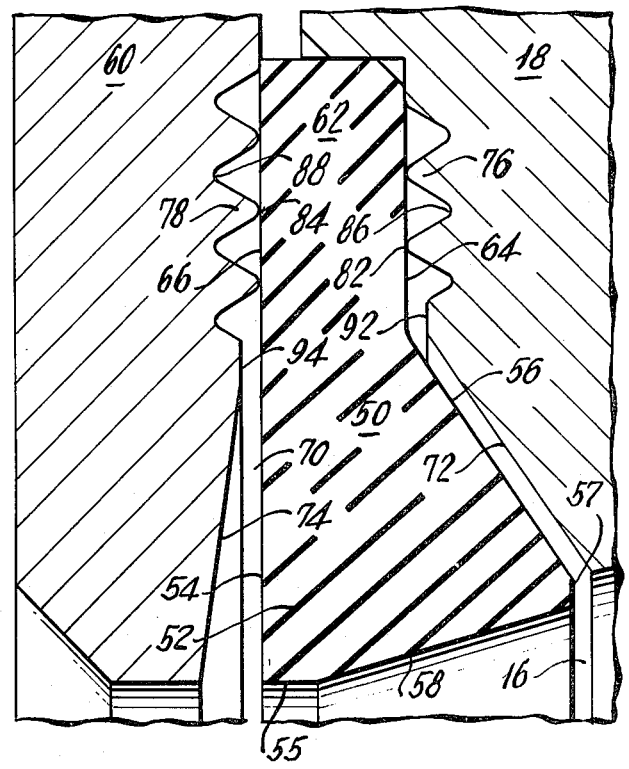
FIG. 3 is an enlargement of the seal assembly of FIGS. 1 and 2 with the assembly unloaded. Such a condition would occur prior to the valve being installed in the fluid flow system.

Referring to FIGS. 3, 4 and 5, seat ring 50 is disposed in chamber 70 open to passage 16, the chamber formed by diverging surface 72 on valve body 18 in juxtaposition with diverging surface 74 on retaining ring 60. Planar surface 92 is disposed on valve body 18 adjacent to diverging surface 72, and planar surface 94 is disposed on retaining ring 60 adjacent to diverging surface 74. In the preferred embodiment serrated surface 76, having alternate concentric lands 82 and grooves 86, is formed on valve body 18 adjacent to planar surface 92, and serrated surface 78, having alternate concentric lands 84 and grooves 88, is formed on retaining ring 60 adjacent to planar surface 94. Lands 82 on valve body 18 are directly opposite the corresponding centers of concentric grooves 88 in retaining ring 60, while the centers of concentric grooves 86 on the valve body are directly opposite lands 84 on the ring.

FIG. 3 illustrates the position and shape of seat ring 50 prior to the abutting of retaining ring 60 to valve body 18, while FIG. 4 illustrates the seat ring after abutment, such as when the retaining ring has been fastened to the valve body or when valve 10 has been installed for service between flanges (not shown) in conduit 20. Seat ring 50 comprises a substantially wedge-shaped section 52 extending into passage 16 and a stationary flanged section 62 outwardly extending from the wedge-shaped section. Section 52 is shown having first side 54 adjacent retaining ring 60 and coplanar with flanged section 62, second side 56 opposite side 54 and diverging from flanged section 62, and a base or sealing surface 58 therebetween. It is believed that the optimum cross-sectional shape for surface 58 is hemispherical. However, to facilitate fabrication of seat ring 50 in the embodiment shown, surface 58 is substantially planar in cross-section, the overall shape of surface 58 being substantially similar to the conical surface of a frustum of a cone. Seat ring 50 is manufactured of a substantially rigid, chemically and thermally resistant material such as a polymer of a fluorocarbon or urethane. Seat ring 50 has been cut back at surfaces 55, 57 to eliminate any curling up of the seat ring when contacted by land 38, thereby preventing any flexible lip-type sealing from occurring between land 38 on disc 30 and surface 58 in section 52. Surfaces 64, 66 on flanged section 62 are parallel and planar when uncompressed. When seat ring 50 is positioned between valve body 18 and retaining ring 60, surfaces 64, 66 are compressed into grooves 86, 88, respectively, forming a labyrinth-type seal preventing leakage of fluid around the seat ring when disc 30 is rotated to the closed position. It has been found experimentally that disc 30 should be in the closed position when seat ring 50 is compressed to properly locate the seat ring. Seat ring 50 is supported on planar surfaces 92, 94 and section 52 extends through chamber 70 into central passage 16. Section 52 is narrower than the corresponding width of chamber 70 permitting pivotal movement of the section by disc 30 as described below.

When disc 30 is in the open position permitting fluid flow through central passage 16, section 52 is disposed in the position indicated by broken lines in FIG. 4. If there had been no fluid flow through central passage 16 immediately prior to disc 30 being rotated perpendicular to the central passage centerline, seat ring 52 is rotated to the position shown in solid lines FIG. 4, substantially equidistant from diverging surfaces 72, 74. Land 38 on disc 30 contacts surface 58, and rotates section 52 to this latter position about a point $O_1$ which lies substantially along the line OB, where point O is the intersection of the centerline of central passage 16 with a perpendicular plane passing through the centerline of stem 17, and point B is a midpoint on the land. Point $O_1$ is the intersection of the extension of line OB and the reference line $A_1$–$A_2$ drawn between planar surface 92 on valve body 18 and planar surface 94 on retaining ring 60. Point $O_1$ normally will be located near the midpoint of line $A_1$–$A_2$. It is important to note that the design of seat ring 50 and chamber 70 result in a truly bi-directional valve, since the position of section 52 shown in solid lines in FIG. 4 is equidistant from diverging surface 72 on valve body 18 and diverging surface 74 on retaining ring 60.

When fluid has been flowing through central passage 16 in the direction indicated by the arrows in FIG. 5, and disc 30 then is rotated perpendicular to the central passage to block flow therethrough, fluid pressure acts on surface 54 forcing section 52 to rotate about point $O_1$ the amount of rotation being dependent on the pressure differential across this section. As section 52 is rotated, every point on the seating band, indicated as $B_1$ $F_1$ on surface 58, would tend to follow a circular locus about point $O_1$, as is illustrated by loci X–$X_1$ and Y–$Y_1$ if it were not for the presence of disc 30. Thus every point on seating band $B_1$ $F_1$ is forced to slide over land 38, wedging section 52 still more tightly against disc 30. Similarly, the remaining points on surface 58, designated $B_1$ F, lying downstream of line $O_1$–$B_1$ will also tend to follow a circular path, such as that shown by locus Z–$Z_1$, which results in points on surface $B_1$ F of section 52 tending to lift away from land 38 of disc 30. This reduces the area of surface 58 actually sealing against land 38, thereby increasing unit loading for a tighter seal. It should also be appreciated that the larger the angle between projected loci on seating band $B_1$ $F_1$ and land 38, the greater the wedging effect at that particular point. Thus, the design of surface 58 on section 52 and the design of land 38 may be modified to vary the amount of wedging effected. It should be noted that all sealing occurs by seating band $B_1$ $F_1$ of surface 58 being wedged against land 38 without lip-type sealing occurring between the surface and the land. Seat ring 50 described herein does not depend on surface 56 of section 52 making contact with diverging surface 72 of valve body 18, or on surface 54 of section 52 making contact with diverging surface 74 on retaining ring 60 for sealing.

Figure 6:
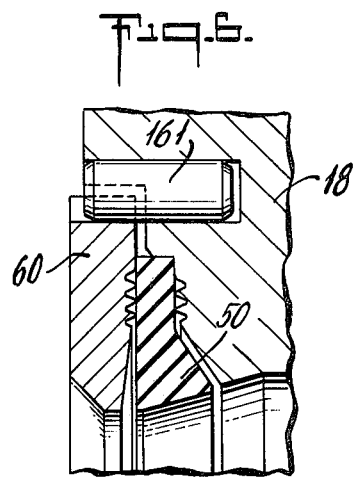
FIG. 6 is a partial sectional view of an alternate form for temporarily affixing the retaining ring to the valve body.

FIG. 6 discloses a slightly different form for affixing retaining ring 60 to body 18, all elements similar to those previously described and performing similar functions having corresponding reference numerals. In this form, a plurality of spring pins 161 are used to temporarily locate retaining ring 60 on valve body 18, with seat ring 50 being disposed uncompressed between the valve body and retaining ring. During installation retaining ring 60 is forced into abutment with valve body 18 by flanges (not shown) on conduit 20 in which valve 10 is located, obviating the need for threaded fastening means, such as fasteners 61 shown in FIG. 1. However, where shop testing is required, valve 10 would continue to be assembled as shown in the embodiment of FIGS. 1 and 2.

Referring once again to FIG. 4, when disc 30 is positioned to permit fluid flow through central passage 16, section 52 of seat ring 50 will be in the position indicated by the broken lines. As disc 30 is rotated perpendicular to central passage 16, land 38 on the disc operates to rotate section 52 about point $O_1$ thereby wedging surface 58 against the land. If there had been no fluid flow through central passage 16 immediately prior to disc 30 being rotated perpendicular to the central passage, section 52 will be rotated about point $O_1$ to assume the position shown in solid lines in FIG. 4, substantially equidistant from diverging surfaces 72, 74. If fluid had been flowing through central passage 16 immediately prior to disc 30 being rotated perpendicular to the central passage, the upstream fluid will exert pressure on surface 54 of section 52 forcing it to rotate about point $O_1$. Since the points on surface 58 of section 52 are prevented from rotating in circular loci by disc 30, they become wedged against land 38 on the disc, the extent to which they are wedged being determined by the pressure differential across section 52. When disc 30 is once again rotated to permit fluid to flow through central passage 16, section 52 will return to the position indicated by the broken lines in FIG. 4.

From the above description, it should be appreciated that the seal assembly described above is bi-directional. In FIG. 4, section 52 is disposed substantially equidistant from diverging surfaces 72 and 74 when disc 30 is rotated closed with no differential fluid pressure acting on this section. Since section 52 rotates about point $O_1$, which lies near the midpoint of reference line $A_1$–$A_2$, surface 58 will seal against land 38 with equal effectiveness irrespective of the direction of fluid flow.

FIG. 7 shows a preferred embodiment of seat ring 50 of FIGS. 1–6. In this preferred embodiment, section 52 has cavity 59 in its centermost position adapted to encase circular back-up means 40. Back-up means 40 composed of any resilient material, such as an elastomeric polymer "O" ring or a metal garter type spring as shown. When land 38 is not in engagement with surface 58, whether it be initially or after repeated cycles of engagement and disengagement, back-up means 40 is in its normal, uncompressed condition and section 52 extends well into passage 16 as shown by dotted lines in FIG. 7. When land 38 engages surface 58, section 52 is rotated about point $O_1$ and back-up means 40, rotated therewith, becomes compressed as shown by solid lines in FIG. 7. The resiliency of back-up means 40 causes when land 38 disengages from surface 58 said back-up means to return to its normal condition and carry section 52 therewith re-extending said section well back into passage 16. Accordingly, subsequent sealing engagement of land 38 with surface 58 will be enhanced via the position of section 52.

In addition to the use of the invention in valves, other areas where effective fluid sealing utilizing the subject invention will become apparent. Similarly, it should be understood that variations and modifications of this invention may be effected without departing from the spirit and scope of this invention.

I claim:

1. A butterfly valve comprising:
  A. a valve body, said body having a passage therethrough with a planar diverging surface in proximity to the passage;
  B. a retaining means removably affixed to said body, said retaining means having a planar diverging surface in juxtaposition to the diverging surface of said body, the surfaces forming a chamber therebetween open to the passage;
  C. a closure means pivotally positioned in the passage adapted to regulate the flow of fluid through the passage, said closure means including a peripheral land adapted to engage a sealing means;
  D. a stem means adapted to rotate said closure means; and,
  E. an annular sealing means positioned in the chamber including in cross section:
    1. a rectangular flanged portion adapted to be secured between said body and said retaining means;
    2. an integral wedge-shaped portion extending from said flanged portion and pivotal thereabout, said wedge-shaped portion having a first side adjacent said retaining ring extending from and coplanar with said flanged portion, a substantially planar second side opposite said first side extending and diverging from said flanged portion; and,
    3. a base joining said first and second sides, said base adapted to cooperate with said peripheral land; said wedge-shaped portion extending into the chamber and passage whereby when the peripheral land engages said base and no fluid is applied to either side of said valve said wedge-shaped portion is disposed substantially equidistant from each diverging surface and when fluid flow is applied to either side of said valve, fluid pressure causes said wedge-shaped portion to pivot towards the other side urging said base into the peripheral land enhancing fluid-tight engagement therebetween.

2. The bi-directional valve of claim 1, wherein said wedge-shaped portion is rotated about a reference line extending through the point of intersection of the passage centerline with a perpendicular plane passing through said stem means centerline and through a midpoint on the peripheral land to urge said base into fluid-tight engagement with the peripheral land when said closure means is rotated perpendicular to the passage to block the flow of fluid therethrough.

3. The butterfly valve of claim 1, wherein said wedge-shaped portion has a cavity adapted to encase a resilient back-up means.

4. The butterfly valve of claim 3, wherein said resilient back-up means is adapted to be compressed whereby when said land engages said base said back-up means is substantially compressed, and when said land disengages from said base said back-up means returns to its uncompressed condition carrying said wedge-shaped portion therewith thereby positioning said base to enhance subsequent sealing engagement of said land with said base.

5. The butterfly valve of claim 4, wherein said resilient back-up means is a metal garter type spring.

* * * * *